(12) United States Patent
Scarzella et al.

(10) Patent No.: US 8,160,434 B2
(45) Date of Patent: Apr. 17, 2012

(54) SYSTEM OF ELECTRICAL THERMOSTATATION OF PIPING OR TANKS

(76) Inventors: Luciano Scarzella, Millesimo (IT); Cristina Scarzella, Millesimo (IT); Maria Grazia Scarzella, Millesimo (IT)

(*) Notice: Subject to any disclaimer, the term of this patent is extended or adjusted under 35 U.S.C. 154(b) by 1003 days.

(21) Appl. No.: 12/015,066

(22) Filed: Jan. 16, 2008

(65) Prior Publication Data

US 2008/0187300 A1 Aug. 7, 2008

(30) Foreign Application Priority Data

Feb. 2, 2007 (IT) .............................. SV2007A0004

(51) Int. Cl.
*A47J 31/00* (2006.01)
*E03B 7/10* (2006.01)
(52) U.S. Cl. ...................................... 392/465; 392/468
(58) Field of Classification Search .................. 392/465, 392/466–496, 396–406, 461, 314–321
See application file for complete search history.

(56) References Cited

U.S. PATENT DOCUMENTS

| 4,323,695 | A | * | 4/1982 | Bloch et al. ..................... 560/145 |
|---|---|---|---|---|
| 4,429,572 | A | * | 2/1984 | Cucuiat et al. .................. 73/433 |
| 4,497,932 | A | * | 2/1985 | Trovati .......................... 524/591 |
| 6,627,429 | B1 | * | 9/2003 | Christensen et al. ......... 435/275 |
| 7,626,146 | B2 | * | 12/2009 | Steinhauser et al. .......... 219/541 |
| 2002/0106466 | A1 | * | 8/2002 | Hausmann et al. .......... 428/35.2 |
| 2003/0186417 | A1 | * | 10/2003 | Brunstedt et al. ............. 435/196 |
| 2005/0003522 | A1 | * | 1/2005 | Carlsen et al. ............. 435/287.2 |
| 2006/0141038 | A1 | * | 6/2006 | Olivieri et al. ................ 424/486 |
| 2006/0219164 | A1 | * | 10/2006 | Cerciello ...................... 118/100 |
| 2010/0096018 | A1 | * | 4/2010 | Wylie et al. ....................... 137/2 |
| 2011/0286727 | A1 | * | 11/2011 | Johnson ........................ 392/465 |

FOREIGN PATENT DOCUMENTS

CN 1589068 * 10/2004

* cited by examiner

*Primary Examiner* — Daniel L Robinson
(74) *Attorney, Agent, or Firm* — Richard M. Goldberg (57) ABSTRACT

System of electrical thermostatation of pipes or tanks, including a jacket that serves to at least partially cover a surface of the piping or tank, the jacket including an external mechanical protection in the form of an external shell and an internal shell, a thermal insulation supplied between the internal shell and the external shell, a heating element for generating thermal energy, an element to spread the thermal energy towards the interior, and a conduit for an electricity supply line.

14 Claims, 8 Drawing Sheets

SYSTEM OF ELECTRICAL THERMOSTATATION OF PIPING OR TANKS

BACKGROUND OF THE INVENTION

This invention concerns a system of electrical thermostatation of pipes for the transport of fluid and semi-fluid products. Furthermore, this invention is referred to the possibility of maintaining the temperature (heating) of a process fluid transported by means of piping or kept in a tank.

It is well known to the state of technology that, in many production processes of the chemical and foodstuff industries and similar, it is necessary to keep the product at a constant temperature, throughout the transfer or piping process, in order to guarantee the conservation of its properties, in particular the degree of viscosity, in such way as to make transport by means of channelling into pipes, possible and economical.

In the current situation thermostatation of process piping is obtained by means of lagged piping, made up of two concentric pipes that create a cavity through which the thermovector fluid may be passed. This solution is made through the assembly of mechanical components (pipes, bends, bottoms) joined by means of fixed welded joints.

One observes that this technique of thermostatation may provoke, in certain cases, contamination of the process fluid by the thermovector fluid, due to any possible cracks or corrosions of the process piping. This is an eventuality that is particularly hazardous in all the fields of application possible in the chemical field, reactions being possible between the two fluids with the possibility of the bursting of the pipe itself; in the pharmaceutical and foodstuff fields, contamination being possible which makes the product transported hazardous and unusable.

Such risk may be reduced, taking preventive actions such as for instance continual quality controls and frequent maintenance of plant and equipment. However, such actions determine greater complexity of the production processes and a subsequent increase in costs.

Furthermore, in case of accidental breakage of a pipe, it may be difficult to identify the position, with subsequent high costs to be added to those relative to the loss of the product.

These well known systems may also generate lack of homogeneity on the transversal cross section of the flow of thermovector fluid inside the cavity, due to the setting up of preferential flows of this fluid and, subsequently, a non uniform distribution of the temperatures on the exchange surface between the thermostating fluid and the thermostatised one. This inconvenience is exalted by the superficial state of the area of heat exchange; deposits and incrustations accentuate the lack of homogeneity of the heat distribution. Furthermore, the insulation of the external pipe of the cavity may be difficult, this being created on "site": not very practical technology, especially for the pharmaceutical and foodstuff industries, where the process piping and thermostatisation need frequent interventions and movements due to operative and productive needs.

Finally, such techniques require the use of superior materials such as stainless steel with low carbon content and high resistance to corrosion.

The issues listed above are currently overcome by creating a system that is able to annul the risk of pollution between the thermostatising fluid and the product, consisting of a heating element travelled over by a circuit of thermovector fluid completely independent from the process circuit. This solution may mean certain inconveniences in case the pipes are to be installed in an external environment at low temperatures, in a particular way when one envisages the use of water as the thermovector fluid and the piping has a discontinuous functioning. Indeed, these possibilities mean the maintaining in functioning of the thermovector circuit to avoid phenomena of freezing. Systems of this type use an electrical tracing of the process pipe in particular creating a direct placing of an electrical heating element alongside the piping. Due to the limited extension of the contact surface between the heating element and the process piping, the exchange rendering is reduced and therefore, in order to obtain the same useful effect, it is necessary to envisage high temperatures in the heating element. Inevitably, high localised temperatures generate lack of homogeneity of the temperatures along the transversal cross section of the process pipe with peaks in correspondence with the point of contact.

This distribution of the temperatures may be incompatible with the peculiar characteristics of the product, especially in the pharmaceutical and foodstuff field.

SUMMARY OF THE INVENTION

The aim of this invention is that of obviating the above mentioned inconveniences.

In particular, this invention concerns an electrical system of electrical thermostatation of pipes for the transport of fluid and semi-fluid products having the features of the attached claim 1.

BRIEF DESCRIPTION OF THE DRAWINGS

The characteristics and advantages of the system according to this invention will be more evident from the following description of one of its typical realisations, exemplifying but not limitative, referred to the schematic drawings attached in which:

FIGS. 16a-b-c-d illustrate a longitudinal cross section and three transversal ones, with FIG. 16b taken along line 16b-16b of FIG. 16a of the coupling of the system at work by means of positioning of the heating element on the internal shell of the jacket in the mounting phase.

DETAILED DESCRIPTION

With reference to the mentioned figures, the system, according to this invention, is applicable to a process pipe or to a tank and envisages the formation and prefabrication of a tubular element (jacket) preferably made in two pieces (half shells) aimed at covering at least partially the surface of said pipe or tank or in general the element to be stabilised in temperature and has means of external mechanical protection (external shell), means of thermal insulation from the outside (insulation), an element to generate the thermal energy (electrical heating element), an element to spread the thermal energy towards the inside (internal shell), one or more conduits for the electrical supply line and electrical and/or pneumatic connections of the control equipment along the piping. These tubular elements are prefabricated modular and independent elements, and they may be placed in numbers in various portions of the process piping or the tank.

The thermal energy, starting from the generator, spreads along the process pipe by means of the spreading element which is in close contact with the same, making the temperature uniform around the entire circumference of the process pipe.

Said tubular element may also be made from a single piece, in which case it is no longer possible to mount it on existing pipes, but insertion is envisaged on the pipe in the prefabrication phase of the same.

For what concerns the special portions of the piping (for instance bends, branches, box couplings, etc.) the continuity of the electrical supply is guaranteed by the passage in insulating sheaths, and, by means of insulated half shells and thus one guarantees the thermal and mechanical insulation towards the exterior.

Thus one comes to create a set of modular elements of complete functionality through which it is possible to realise coverings having the function of thermostatation of any process pipe, with welded or flanged connections.

In case of pipes with a large diameter and storage tanks, the system envisages that such tubular elements are made through the use of a stave, as a modular element having the same functional characteristics of the jacket described above.

The covering is created through the longitudinal coupling of many staves, preferably joined like a roller blind by means of a flexible element that allows the optimal laying of the internal shells of each stave on the external surface of the large diameter pipe or of the tank to insulate and heat.

The electrical connectors at the ends of the staves create the continuity of the electrical supply line and the shunts in parallel of supply to the heating elements.

Instead, for what concerns the various components of the plant (for instance, valves, filters, pumps, etc.) the system envisages the creation of an internal shell of a simple geometrical shape (for instance parallelepipedal, cylindrical, spherical) which goes to close off the component of the plant.

The shell is made in two or more parts in such way as to be positioned or removed from the element to thermostatise and, with half shells, the duly supplied electrical heating elements are positioned. The thermal insulation towards the exterior is guaranteed by means of a container that may be opened made from a multilayer covering made up of the external surface with mechanical resistance and an internal layer in insulating material.

Figure 1:
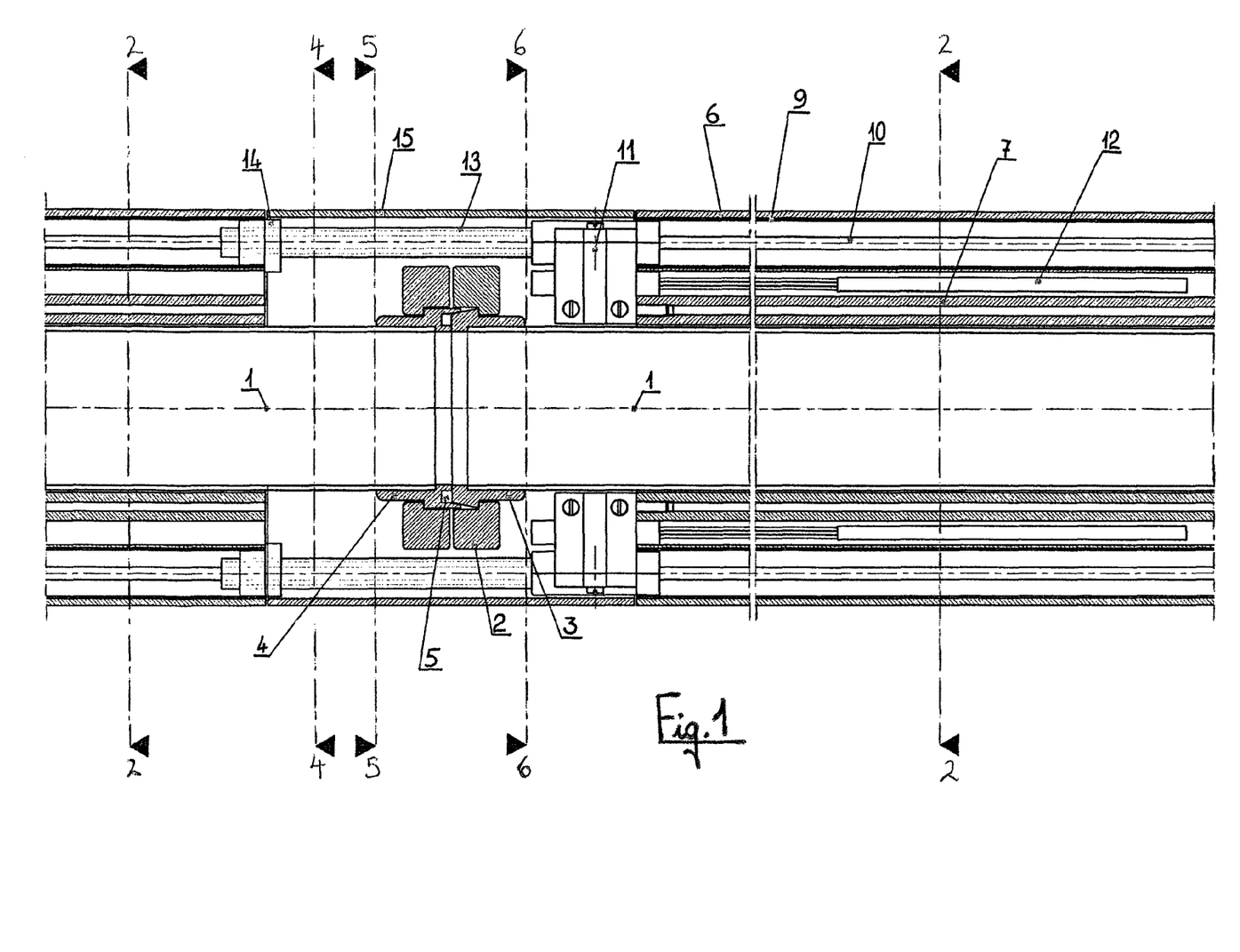
FIG. 1 shows a longitudinal cross section of a pipe to which the system according to this invention has been applied.
Figure 2:
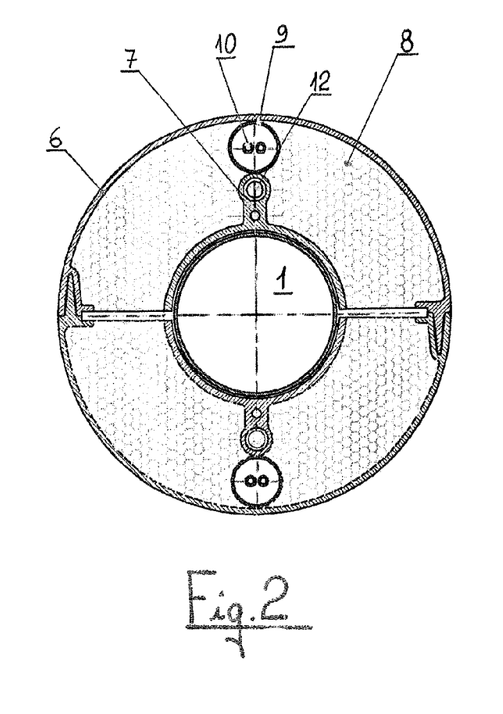
FIG. 2 shows a transversal cross section (2-2 of FIG. 1) of a pipe to which the system according to a first form of this invention has been applied (jacket in two parts)

In FIG. 1, in particular, the tubular element applied to a process pipe 1 is illustrated. Of that process pipe one illustrates a portion in which a joint is visible made up of a free coupling flange 2 of the process pipe, a male pipe union 3 for coupling and a female pipe union 4 for coupling and a seal 5.

Figure 3:
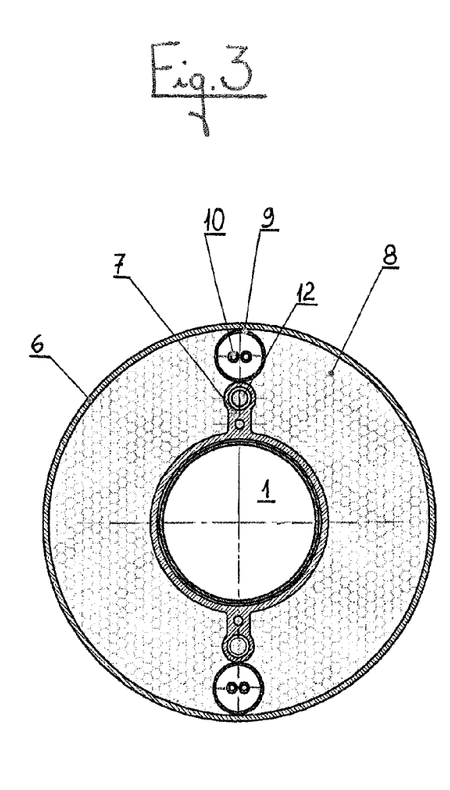
FIG. 3 shows a transversal cross section of a pipe to which the system according to a second form of this invention has been applied (jacket in just one piece)
Figure 4:
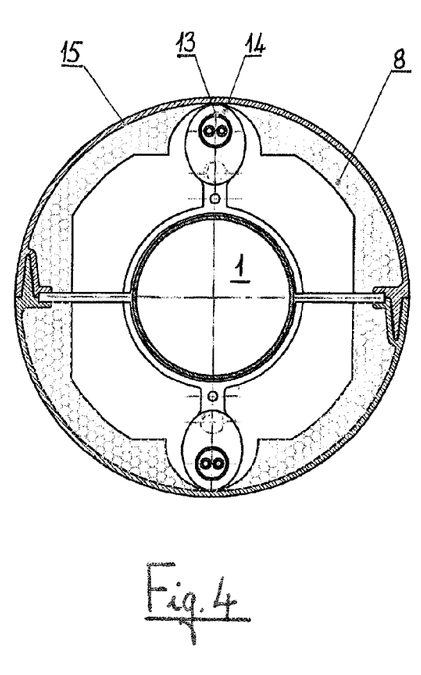
FIG. 4 shows a transversal cross section (4-4 of FIG. 1) of a pipe in correspondence with the joint coupling to which the system according to this invention has been applied.
Figure 5:
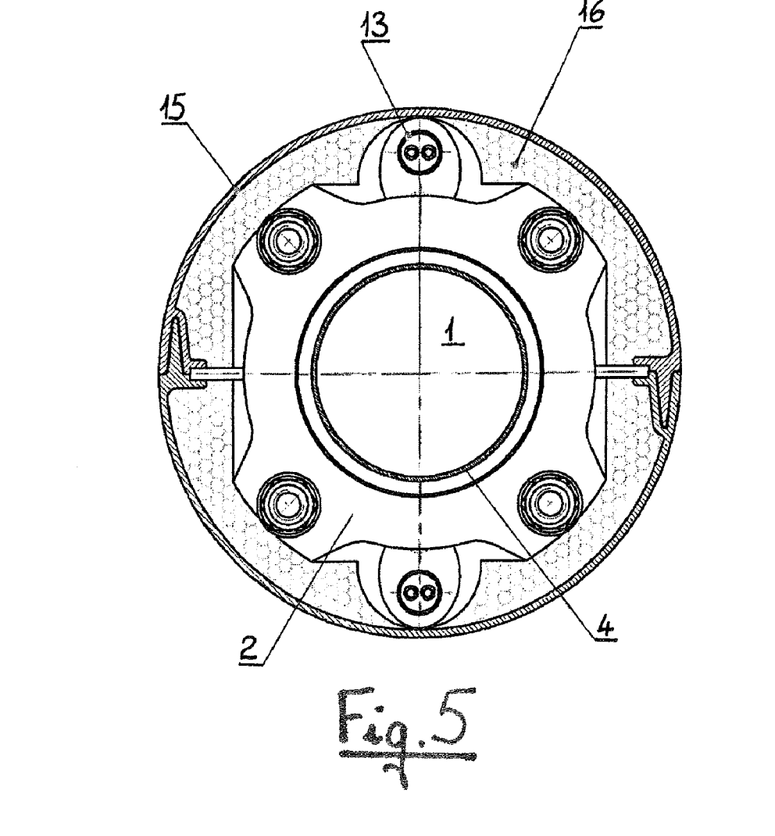
FIG. 5 shows a further transversal cross section (5-5 of FIG. 1) of a pipe in correspondence with the joint coupling to which the system according to this invention has been applied.
Figure 6:
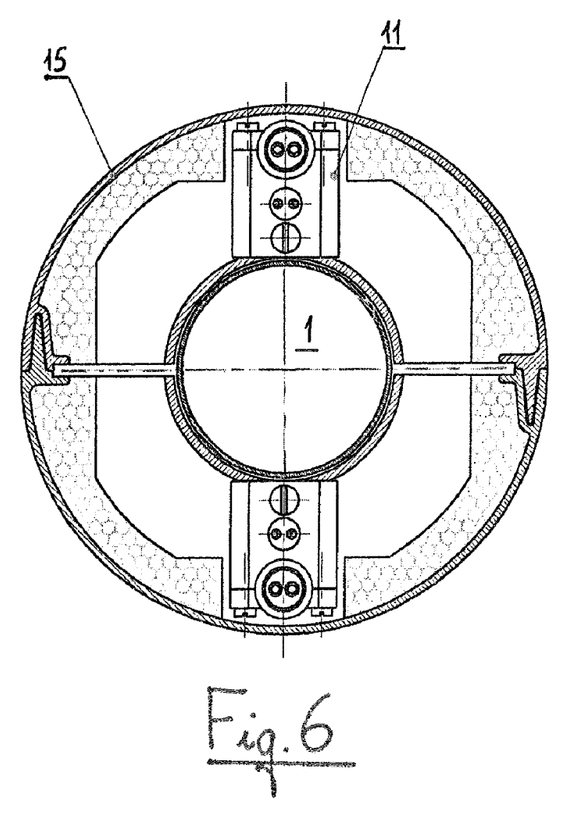
FIG. 6 shows a further transversal cross section (6-6 in FIG. 1) of a pipe in correspondence with the joint coupling to which the system according to this invention has been applied.
Figure 7:
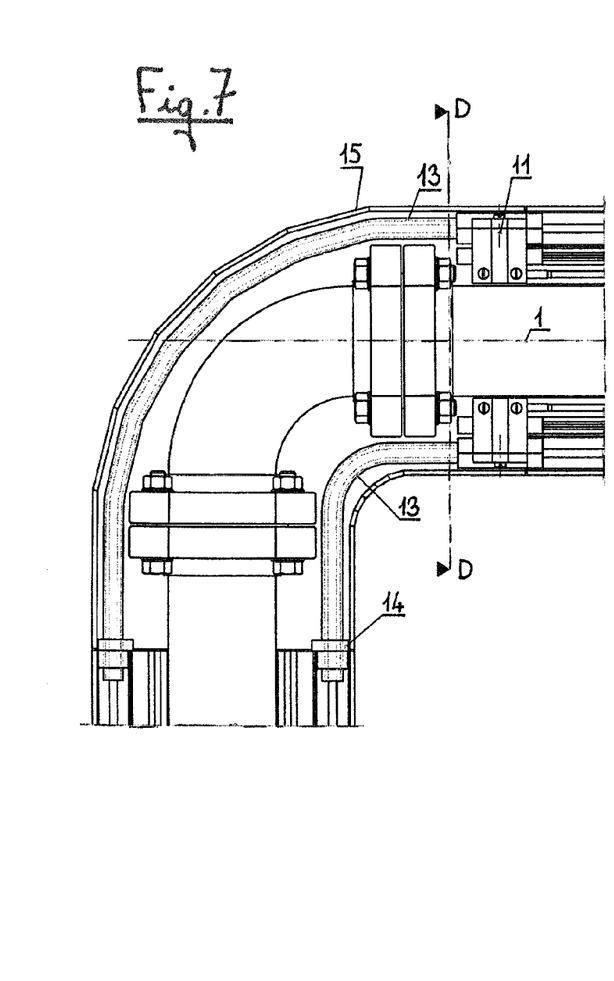
FIG. 7 shows a longitudinal cross section of a stretch of pipe on a bend.
Figure 8:
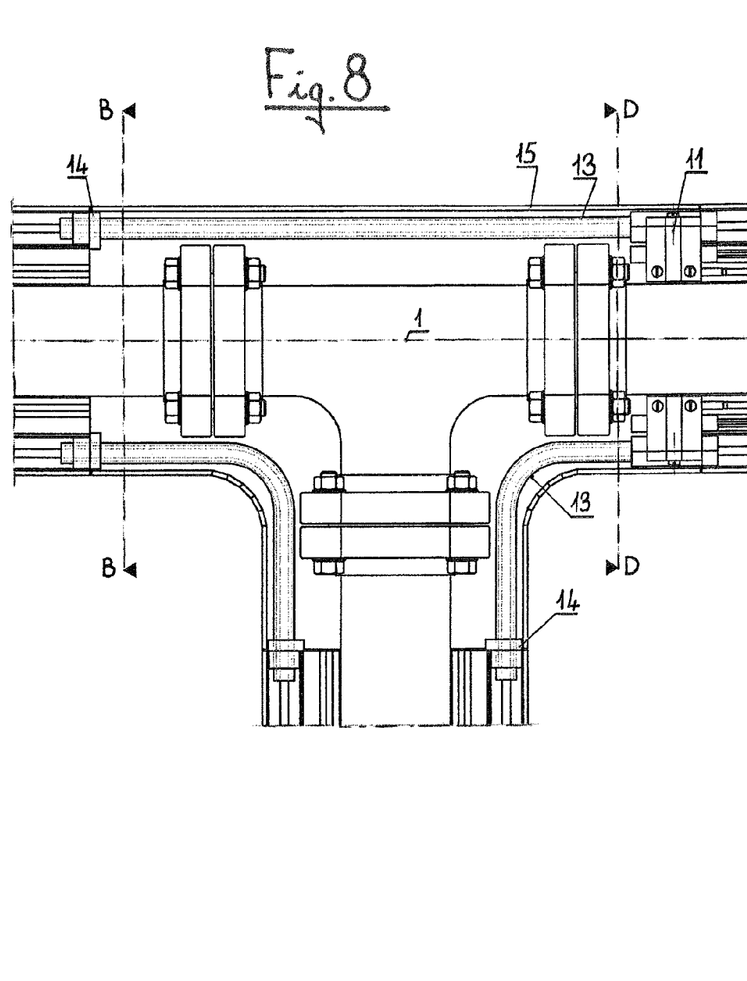
FIG. 8 shows a longitudinal cross section of a stretch of pipe having a "T" shaped branch.

The tubular element (jacket) comprises an external shell 6, an internal shell 7 between which an appropriate insulation 8 is supplied, a conduit 9 for an electricity supply line 10, a heating element 12 (for instance an armoured resistance, a heating cable, a heating plate, a self-regulating heating band, etc.) and a connector 11 between the electricity supply line and the heating element. The tubular element also comprises, in the portion of said joint, in order to allow electrical continuity, an insulating sheath 13 for that line 10, a guide cover 14 in neoprene and an external coupling 15. In the form of realisation shown in FIG. 3 the tubular element is made up of a single piece.

Figures 9, 10, 11, 12, 13:
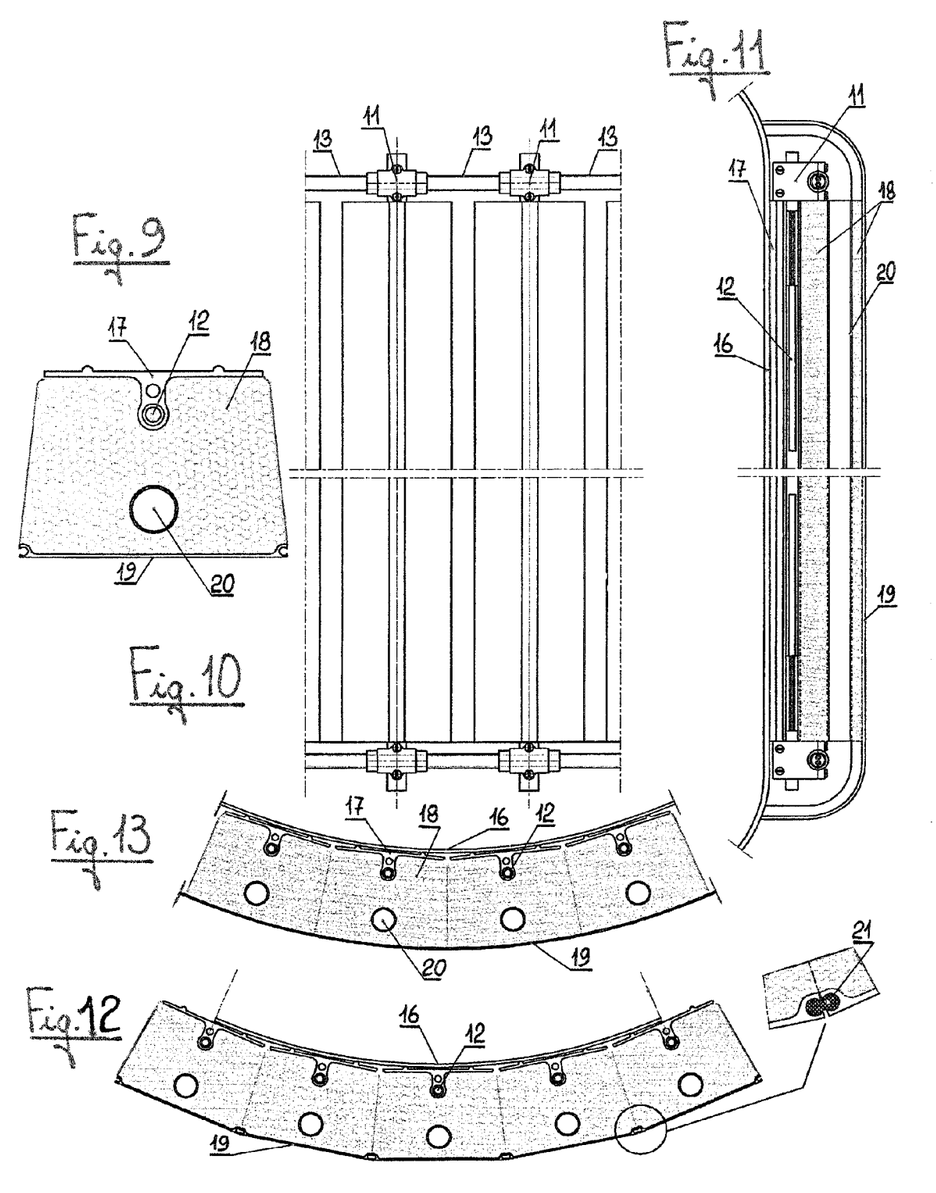
FIGS. 9, 10, 11, 12 and 13 illustrate the system according to this invention applied to the heating of fluids stored inside tanks.

In FIG. 9 the system, according to this invention, is used for tanks and pipes of large diameter and comprises a tubular element or jacket created by means of a stave, having the internal shell 17 of the jacket, the external shell 19 of the jacket, within which the insulation 18 is envisaged, the conduit 20 of the electricity supply line and the electrical heating element 12.

In FIG. 11 an application of the system along a tank, of which one highlights the plating 16, is illustrated. The tubular element or jacket is envisaged in association with this plating and comprises the connector 11 between the electricity supply line and the heating element, the internal shell 17 of the jacket, the external shell 19 of the jacket within which the insulation 18 is envisaged, the conduit 20 of the electricity supply line and the electrical heating element 12.

In FIG. 12, in a form of realisation, the system is applied to tanks or to pipes with a large diameter with the longitudinal coupling of several staves, joined like a roller blind by means of a flexible element 21 that allows the optimal positioning of the internal shells of each stave on the external plating of the large-diameter pipe or tank to be insulated and heated. These staves have no external shell which is replaced with a later finishing in metallic clamping.

The advantages of the insulation system with modular sets, as described, are the following:
construction of a single insulation/thermostatation system;
independence of the insulating set from the piping or equipment to be insulated; the modular set may be created after the fabrication of the equipment or piping;
maintenance of the modular set may be performed without removal of the piping or equipment;
zero risk of contamination of the product;
ease of construction and installation.

In this way one has created a system of insulation and thermostatation that is very economical, practical and independent from the plant to be insulated, and that allows easy dismantling and remounting of the insulation making maintenance of the equipment less costly.

Assembly of the jacket on the pipe or tank or generally on the element to be stabilised in temperature may take place in a differentiated way depending on the conditions.

Figure 14A:
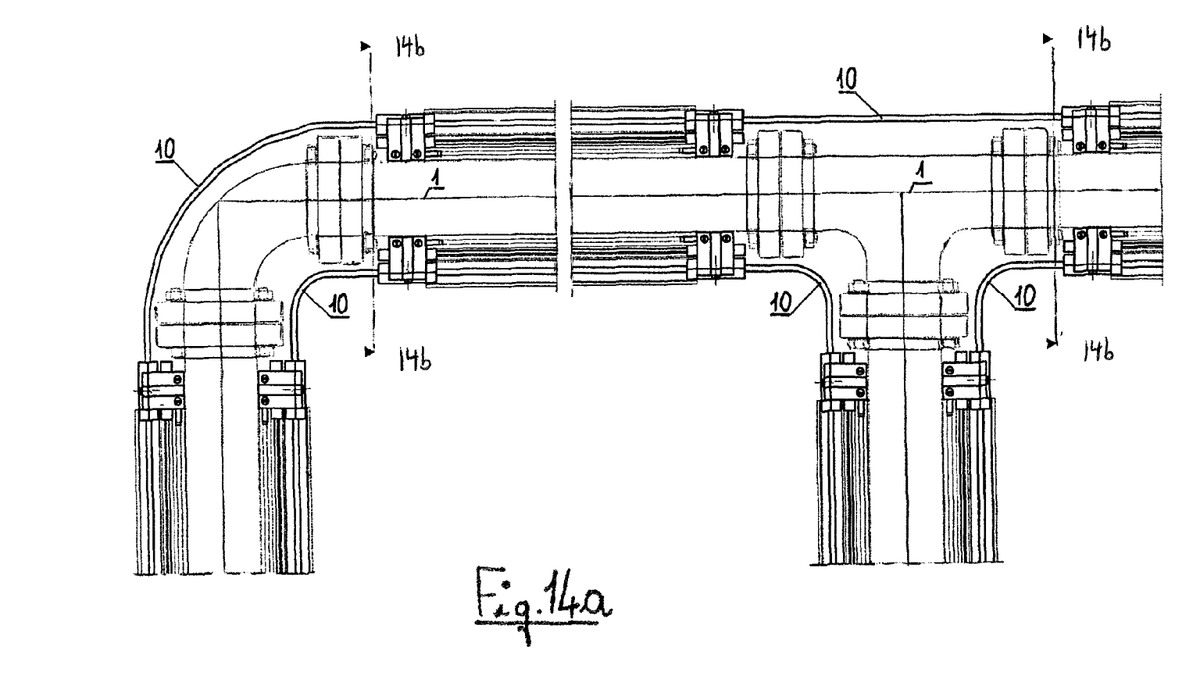
FIGS. 14a-b illustrate a longitudinal cross section and a transversal one along line 14b-14b of FIG. 14a of the coupling of the system with insertion of the heating element in the jacket in the prefabrication phase.
Figure 14B:
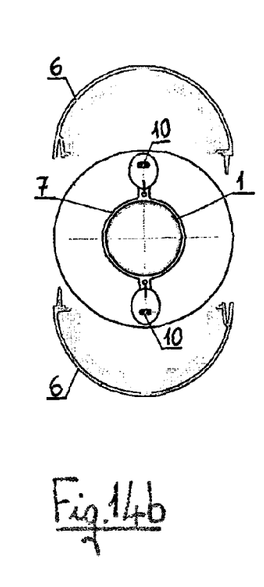

In particular in FIGS. 14*a-b* one envisages that the heating element is coupled with the rectilinear half shells of the jacket already in the prefabrication phase, positioning it in the suitable seat of restraint present on the internal shell 7; in this case the electrical circuit is completed upon competition of the mechanical mounting creating electrical continuity of the circuit with the laying of the U-bolts for electrical connection in correspondence with the individual stretches of the pipe, (bends, branches, flanged joints, organs of manoeuvre, etc.), left bare and later completed with the laying of the respective half shells for insulation.

Furthermore, one points out the possible use of the modular jacket element, made up of only external half shells and the insulating layer, as element of thermal insulation prefabricated for pipes, or stretches of pipes that need only insulation.

Figure 15A:
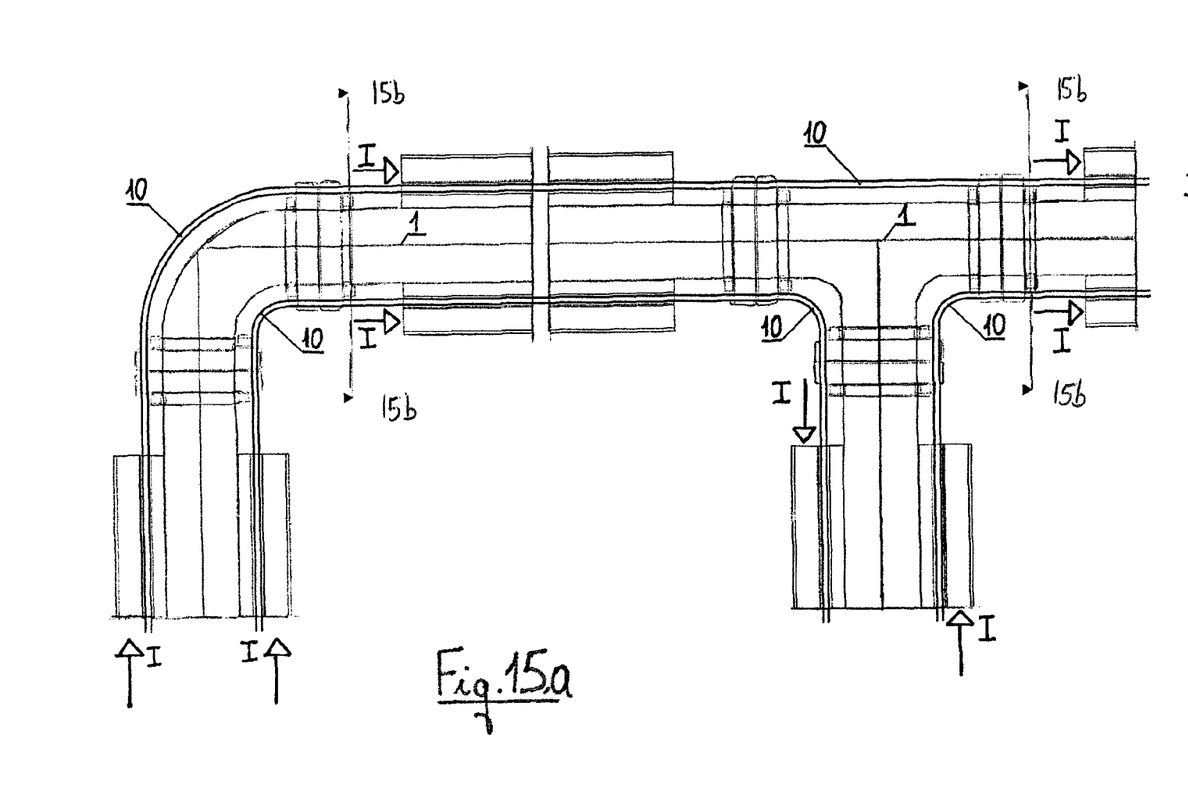
FIGS. 15a-b illustrate a longitudinal and transversal cross section along line 15b-15b of FIG. 15a of the coupling of the system at work for insertion of the heating element in the jacket in the mounting phase.
Figure 15B:
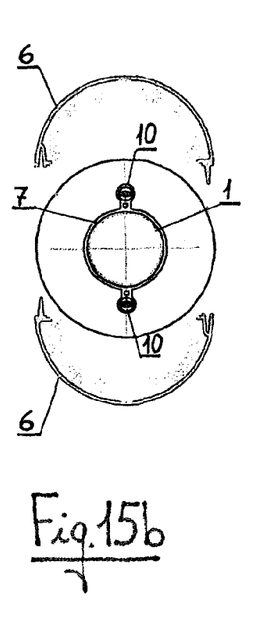

In FIGS. 15*a-b* one envisages that the heating element, in this case one makes use of continuous heating elements (heating cable, heating plate, self-regulating heating band) is coupled longitudinally with the pipe by means of insertion in the appropriate seat present on the internal shell 7 (the direction of insertion identified in the figures by the arrows 1), this operation is carried out with the mechanical assembly of the system complete making use of the access points in correspondence with the stretches of bare pipe (bends, branches, flanged joints, organs of manoeuvre, etc.) and, later, completed with the laying of the half shells of insulation in correspondence with the individual points.

Figures 16A, 16B, 16C, 16D:
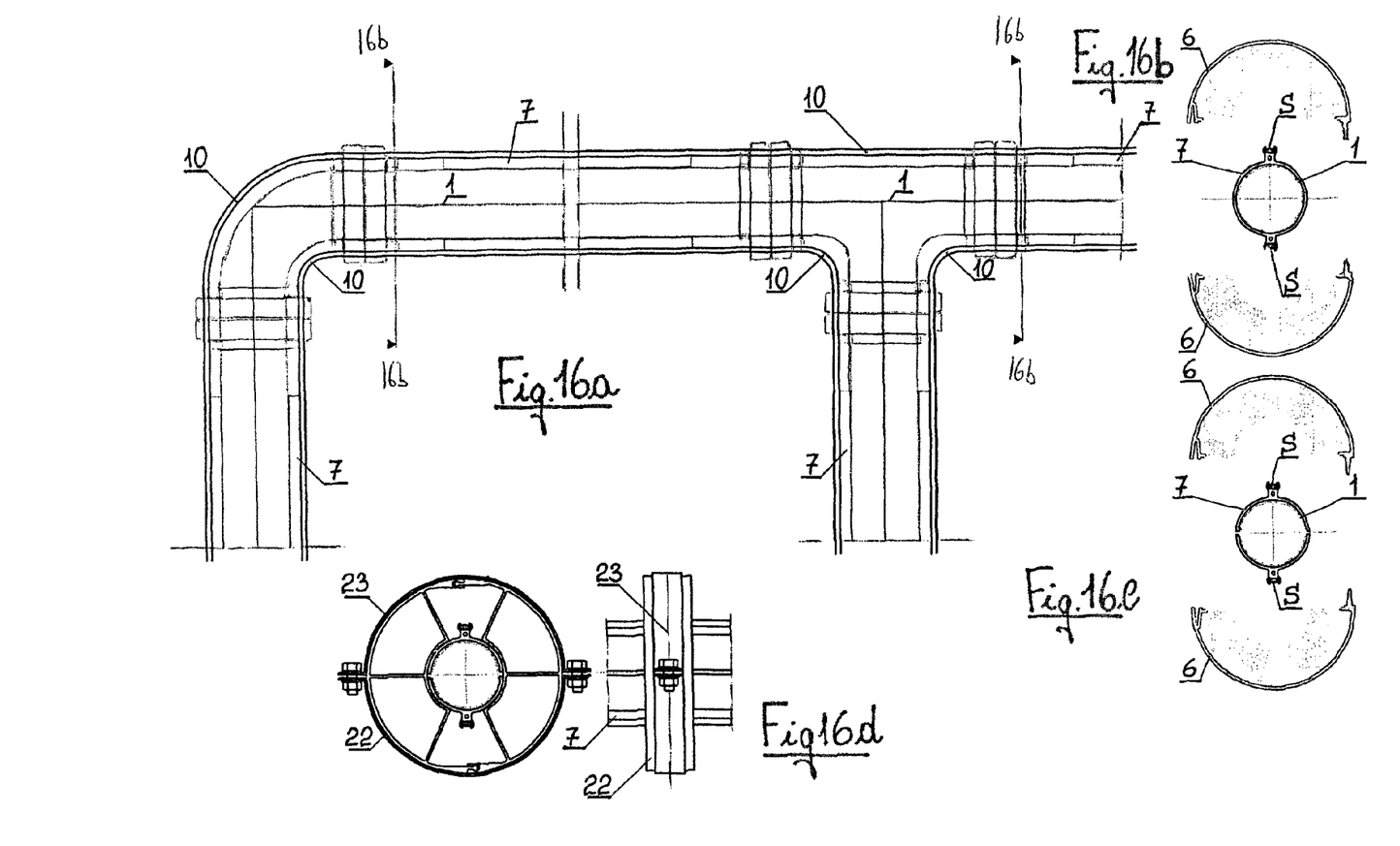

In FIGS. 16*a*-*b*-*c*-*d* one envisages that the heating element (also in this case one makes use of continuous heating elements such as a heating cable, heating plate or self-regulating heating band), is coupled longitudinally with the pipe by means of positioning in the appropriate seat S (runner) present on the outside of the inner shell, which may be made of a single piece and previously coupled with the process pipe in the prefabrication phase of the same, only in the case of a new pipe. This operation is performed upon completion of the mechanical assembly of only the process pipe and the inner shell and, later, the mounting of the entire system will be completed with the laying of the external half shells with the insulation layer. The external half shells will be rectilinear in case of rectilinear pipes and special in correspondence with individual points. In such case the temporary support for the process pipe is performed with the positioning of an adaptor element 22, in correspondence with a support collar 23, which has the task of simulating the external diameter of the finished piping; said adaptor element will later be removed to allow the definitive mounting of the insulating half shells.

What is claimed is:

1. System of electrical thermostatation of a containment element for liquids, comprising a jacket that serves to at least partially cover a surface of the containment element and including:
    an external mechanical protection formed by an external shell,
    a generator element for generating thermal energy within the external mechanical protection,
    an internal shell to spread the thermal energy towards the interior, the internal shell being positioned within the external shell,
    the generator element positioned between the external shell and the internal shell and in direct thermal communication with the internal shell,
    a thermal insulation between the internal shell and the external shell,
    an electricity supply line separate from the generator element, and
    at least one conduit defined by a conduit wall separate from the external mechanical protection and formed between the external shell and the internal shell for receiving the electricity supply line along a majority of the length of the surface of the containment element, said at least one conduit being positioned outwardly of said generator element and closer to said external shell.

2. System according to claim 1, in which said jacket:
    wherein the at least one conduit is adapted to additionally receive for at least one of the following:
        an electrical connection, and
        a pneumatic connection
        for control equipment along piping,
    and further comprising:
    a heating element as said generator element for thermal energy, and
    a connector between the electricity supply line and the heating element.

3. System according to claim 2, in which said jacket is created in the form of two opposing half shells.

4. System according to claim 2, in which said jacket is created in a single piece.

5. System according to claim 2, in which said heating element is at least one of the following:
    an armoured resistance,
    a heating cable,
    a heating plate, and
    a self-regulating cable.

6. System according to claim 2, in which said jacket, in correspondence with a joint between two stretches of one said containment element on which it is applied in order to permit electrical continuity, comprises an insulating sheath for said electricity supply line, a neoprene guide cover and an external coupling.

7. System according to claim 4, in which said jacket is mounted on the containment element by insertion in a prefabrication phase of the same.

8. System according to claim 3, in which said jacket is mounted on the containment element already in place.

9. System according to claim 2, in which said heating element is coupled to a seat of restraint on the internal shell in a prefabrication phase of the jacket.

10. System according to claim 2, in which said heating element is inserted into a seat of restraint on the internal shell of the jacket with mechanical mounting of the system complete.

11. System according to claim 2, in which said heating element is inserted into a runner on the internal shell of the jacket with mechanical mounting of the system complete.

12. System according to claim 1, in which the jacket is created by only external shells and thermal insulation is provided between the external shells and said containment element that need insulation.

13. System according to claim 1, wherein said containment element is selected from the group consisting of a pipe and a tank.

14. System of electrical thermostatation of a containment element for liquids, comprising a jacket that serves to at least partially cover a surface of the containment element and including:
    an external shell formed as a mechanical protection,
    a generator element formed as a heating element for thermal energy,
    an internal shell to spread the thermal energy towards the interior,
    a thermal insulation supplied between said internal shell and said external shell,
    at least one conduit for at least one of the following:
        an electricity supply line,
        an electrical connection, and
        a pneumatic connection
        for control equipment along piping,
    a connector between the electricity supply line and the heating element,
    wherein said jacket is adapted to be applied to said containment element with a large diameter, said jacket including a number of staves joined as a roller blind by a flexible element which allows optimal laying of the internal shells of each jacket on external plating of the large-diameter containment element to be insulated and heated.

* * * * *